(12) United States Patent
Huilgol

(10) Patent No.: US 9,141,736 B2
(45) Date of Patent: Sep. 22, 2015

(54) METHOD FOR POWER ESTIMATION FOR VIRTUAL PROTOTYPING MODELS FOR SEMICONDUCTORS

(71) Applicant: Ninad Huilgol, Fremont, CA (US)

(72) Inventor: Ninad Huilgol, Fremont, CA (US)

(*) Notice: Subject to any disclaimer, the term of this patent is extended or adjusted under 35 U.S.C. 154(b) by 0 days.

(21) Appl. No.: 14/016,206

(22) Filed: Sep. 2, 2013

(65) Prior Publication Data

US 2015/0067634 A1    Mar. 5, 2015

Related U.S. Application Data

(60) Provisional application No. 61/696,213, filed on Sep. 2, 2012.

(51) Int. Cl.
*G06F 17/50* (2006.01)

(52) U.S. Cl.
CPC ........ *G06F 17/5036* (2013.01); *G06F 2217/78* (2013.01)

(58) Field of Classification Search
CPC .................. G06F 17/5036; G06F 2217/78
USPC ........................... 716/106, 111, 136
See application file for complete search history.

(56) References Cited

U.S. PATENT DOCUMENTS

| 2005/0223344 | A1 | 10/2005 | Sato et al. |
| 2011/0035203 | A1 | 2/2011 | Dalton et al. |
| 2012/0203480 | A1* | 8/2012 | Frerich et al. ............ 702/60 |

* cited by examiner

*Primary Examiner* — Vuthe Siek
(74) *Attorney, Agent, or Firm* — Zilka-Kotab, PC

(57) ABSTRACT

The present invention may comprise an apparatus and method for calculating power consumption, including a unit for generating a clock-level analysis without synthesis of an algorithm description and calculating operating ratios of storage elements and arithmetic units. The invention may also comprise a method for estimating the power to be consumed by a SystemC model. By estimating this value, a user may gauge the amount of power a specific semiconductor design might consume, once manufactured into a chip.

20 Claims, 5 Drawing Sheets

METHOD FOR POWER ESTIMATION FOR VIRTUAL PROTOTYPING MODELS FOR SEMICONDUCTORS

CROSS-REFERENCE TO RELATED APPLICATION

The application claims priority from U.S. Provisional Patent Application No. 61/696,213, filed Sep. 2, 2012, the contents of which are incorporated herein by reference.

BACKGROUND OF THE INVENTION

The present invention relates generally to virtual prototyping. Specifically, the invention relates to a method for predictive simulation and power estimation of microdevices and microsystems.

Portable and high-density micro-electronic devices make power dissipation of very large scale integrated (VLSI) circuits a critical concern. Because of limited battery life, reliability issues, and packaging and cooling costs, power consumption for devices is a critical design concern. To avoid issues associated with excessive power consumption, computer design helps to estimate power consumption of VLSI designs.

The rapid progress in microsystems technology is increasingly supported by specific modeling methods and dedicated simulation tools. These methods not only enable the visualization of fabrication processes and operational principles, but also assist a designer to make decisions for finding optimized microstructures under relevant technological and economical constraints. Currently efforts are being made towards using simulation platforms for the predictive simulation of microsystems, i.e., the "virtual fabrication" and "virtual experimentation and characterization" on a computer.

A digital semiconductor chip is often designed using a Hardware Description Language (HDL) such as Verilog or VHDL (Very High-Speed Integrated Circuit, VHSIC, Hardware Description Language). To verify that the design operates according to the design specification, it must be simulated in a verification environment. These simulations are typically done using commonly available simulation tools such as NC Sim (from Cadence) and VCS (from Synopsys). Other simulators from various different vendors may also be used. As these simulations run in a "cycle-accurate" mode, they tend to be very accurate in representing the behavior of the design. In "cycle accurate mode," the real clock signal that is expected to be provided to the semiconductor chip is supplied to the design during simulations. Since the real clock signal cycles many times during simulations, the simulations tend to be very slow, as each clock cycle (or "tick") necessitates evaluation of the simulator events. Typically, modern digital design involves clock signal frequencies of several million cycles per second to several billion cycles per second. Thus, simulating real world conditions which happen over several minutes becomes extremely slow.

One of the methods to speed up these simulations and increase the simulation performance is to represent the semiconductor design in a higher abstraction level. The higher abstraction representation of the semiconductor design will use the concept of Transaction Level Modeling (or TLM) to model the behavior of the semiconductor design. Such a higher abstraction model might be written with a language like SystemC, SystemVerilog, C, C++ or any other suitable language. This higher abstraction model is known as a "Virtual Prototype" of the semiconductor design. The virtual prototype can then be simulated in a SystemC simulator (many simulation tools are available from various vendors). The simulations in a SystemC/TLM simulator tend to be much faster, up to 200 or 300 times faster as compared to the semiconductor design simulations.

The acceleration is due to the simulations run in one of the following modes prescribed by the standards committee for SystemC/TLM modeling, Accelera.
  A) "untimed"—where no clock signal used.
  B) "approximately timed"—different transaction "phases" are used to time the model (clock signal is used rarely in this mode).
  C) "loosely timed"—more transaction phases are used than in B (clock signal is used occasionally in this mode).

In A, the clock signal is not used at all. In B, the clock signal is rarely used; instead the model relies on the "start" phase of a transaction or event occurring within the block and the "end phase" of that transaction or event. In C, more phases of the transaction are used to time the model (start phase, active phase, acknowledgement phase, end phase, etc. More phases may be defined by the user as required).

There is no "cycle accurate" mode prescribed by Accelera when building and simulating a virtual prototype. Cycle accurate mode is the most accurate mode used to simulate the real semiconductor design using the real clock signal, as described previously. Accelera usually recommends that the number of modes be no greater than three. The present invention may comprise a number of modes greater than three.

The challenge: In a semiconductor design built using an HDL (like Verilog or VHDL) it is easier to estimate the power consumption based on the frequency of the clock signal that the design runs on, and several other parameters inside the design. This results in a fairly accurate estimation of the power that the design might consume, once it is applied into a real world semiconductor chip. However, in a virtual prototype of the semiconductor design, any power estimation will not be accurate. The reason is that semiconductor design simulations always run in a "cycle-accurate" mode, using every clock tick of the real clock signal. In the virtual prototype, in the any of the timing modes: untimed, approximately timed or the loosely timed, the clock used is an approximation of the real clock signal.

Power estimation can be hampered in complexity, time, and cost, by engaging in model synthesis. Power estimation without performing the model synthesis step, has been avoided due to the industry's failure to develop a method of estimating power that excludes model synthesis. If the power estimation process could be performed without model synthesis, then time and costs could be decreased.

There is a need to give an accurate estimation of the power consumed in a virtual prototype, because today's low-power semiconductor designs demand an estimation of power from the virtual prototyping systems. The virtual prototype is typically built very early on in the design process. Thus, if the prototype could provide an accurate estimation of power, it helps the user to make better design choices, before the design gets finalized. Also, the method should look towards streamlining where feasible, such as concerning synthesis steps.

SUMMARY OF THE INVENTION

In one aspect of the present invention, a method for measuring power in a virtual prototype for a model semiconductor design may comprise; identifying, within a netlist representing an integrated circuit, one or more transistors coupled to a voltage supply for which to estimate power as applied to a virtual prototype representing the integrated circuit, generating a respective measurement statement for each of the one or more transistors, wherein the respective measurement statement is usable by a circuit simulation tool to measure the power consumed within the virtual prototype of a design block during a simulation of the virtual prototype representing the integrated circuit, without synthesizing the model, and, creating a measurement file and placing respective measurement statements within the measurement file, wherein the measurement file is usable by the circuit simulation tool for performing the simulation of the integrated circuit.

In another aspect of the present invention, a method for power evaluation may comprise (sometimes for each respective module of a plurality of modules); providing an Electronic System Level Circuit Description (ESLCD) containing a plurality of operations of modules for analysis, reviewing the SLCD and identifying those operations of modules of the ESLCD that are equivalent to a previously analyzed case, a case comprising an operation of a module, and those operations of modules of the ESLCD that have no equivalent previously analyzed case, for each operation of module of the ESLCD that is equivalent to a previously analyzed case, retrieving a power macro-model of the previously analyzed case from memory and assigning that power macro-model to that operation of module in the ESLCD, for each operation of module of the ESLCD that has no equivalent previously analyzed case, generating a power macro-model for each operation of module and assigning that generated power macro-model to that operation of module in the ESLCD, using the plurality of power macro-models, sample input vectors and sample output vectors, evaluating the power consumption of each of the operation of modules in the ESLCD and summing the power consumption of each of the operation of modules to provide a system level power estimate, wherein the cases are defined by a circuit description and a context of the input stimuli under which the circuit is exercised, wherein the context of the input stimuli under which the circuit is exercised further comprises a testbench description, the testbench description partitioned into segments, and producing a monitor file wherein the monitor file comprises the test bench description and a pair of print statements associated with each segment in the testbench description, in which the print statements cause the simulation time of execution of the print statement to be printed to a designated file along with an identifier of the segment.

These and other aspects, objects, features and advantages of the present invention, are specifically set forth in, or will become apparent from, the following detailed description of an exemplary embodiment of the invention.

BRIEF DESCRIPTION OF THE DRAWINGS

The above and other aspects of the present invention will become more apparent by the following detailed description of exemplary embodiments thereof with reference to the attached drawings, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Model synthesis, such as logic synthesis, entails costs, time expenditure, and manpower. For power estimation using model synthesis of virtual prototypes, wherein architectural exploration and system level performance analysis are important goals, power estimation may be achieved without full model synthesis, saving excessive costs, time, and manpower. This invention provides a method to estimate power in a virtual prototype without model synthesis.

A virtual prototype of a semiconductor design consists of many blocks, each performing a specific task. Each block can have either a single clock, or multiple clocks supplied to it. Every block might have a single or multiple voltages applied to it. The blocks also might get turned off or on, be in sleep mode, active state, and such. Thus, the power consumed varies widely. This is called dynamic power consumed. In a quiescent state, the blocks still consume some power due to the leakage in the transistors that make up the chip. This is called leakage of power or static power consumption. Both must be taken into the estimation of the total power consumed as a whole inside the design.

Static Power or "Ps" can be measured by $$Ps=(\text{leakage power estimation per gate})\times(\text{number of gates expected in the block}).$$

Figure 1:
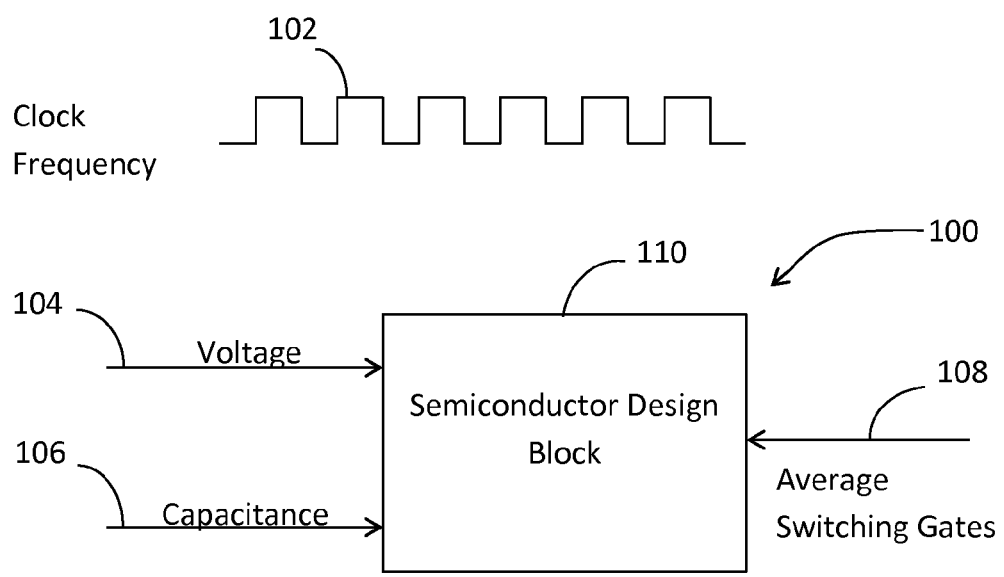
FIG. 1 is a schematic block diagram of a semiconductor design block, according to an embodiment of the present invention.

A power estimation system 100, involving a semiconductor design block 110 is shown in FIG. 1. A clock frequency signal 102 may be alternately represented by f. A voltage 104 that is expected to be supplied may be represented by V. Load capacitance 106 expected for block 110 may be represented by C. The average switching gates 108 in the block 110 may be measured per clock tick and represented as a. Pd may represent the dynamic power consumed by block 110.

The relationship may be understood as the dynamic power is equal to the product of the load capacitance, the square of the voltage, the frequency, and the average switching gates value.

$$Pd = C \times V^2 \times f \times a$$

The above representation is a model of the relationship when the block becomes part of a chip.

The total power dissipation for a block is thus estimated as:

$$\text{Total Power, } P = Pd + Ps.$$

The above is for a semiconductor design block and not the virtual prototype of the block.

In a virtual prototype of the above block, the clock is used as a reference to synchronize the behavior of the block at approximate intervals, thus deviating significantly from the true frequency of the clock. There is also no voltage, leakage power, average switching gates, or loading capacitance information available in a virtual prototype.

Figure 2:
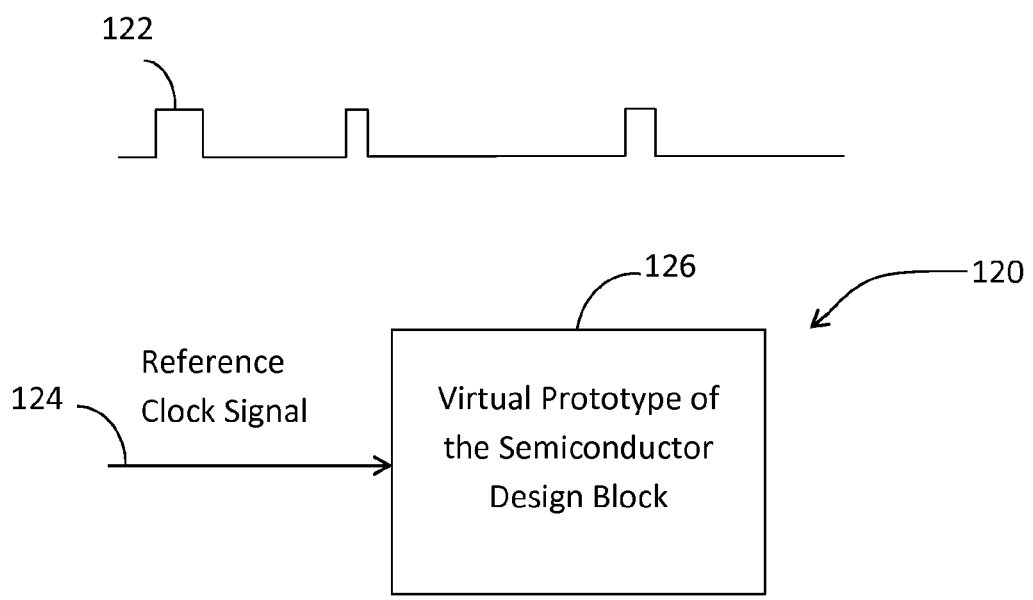
FIG. 2 is a block diagram of a virtual prototype of a semiconductor design block, according to an embodiment of the present invention.

As shown in the system 120 displayed in FIG. 2, the clock signal 122 used in a virtual prototype looks much different than the clock signal used in the real design, shown in FIG. 1. An approximation of the real clock is used, to speed up the simulations. This directly impacts the clock frequency "f" in the dynamic power equation, and gives rise to very imprecise calculation of Pd, or dynamic power. Reference clock signal 124 may serve to calibrate, or standardize, variations in the clock signal 122 as handled within the virtual prototype 126.

Due to this approximation of the clock signal in the virtual prototype 126, combined with the lack of voltage, load capacitance, average number of switching gates and leakage power parameters, the block's power consumption cannot be estimated accurately.

To accurately estimate the power in a virtual prototype, the construction must be enhanced, by adding one or more of the following:

1. A "Power Estimation Block" (or P.E. block) that works in conjunction with the virtual prototype.
2. The real clock signal must be supplied to the Power Estimation Block. This is the same clock that is supplied to the design on which the virtual prototype is based, not the approximated clock.
3. The voltage consumed by the block must be supplied as a parameter to the power estimation block.
4. The load capacitance expected for the block.
5. The leakage power per gate that is expected within the design must be supplied as a parameter.
6. Expected number of gates for the block.
7. Any additional power consuming parts that might be specific to the design might also be supplied.
8. A means of communication between the virtual prototype and a "Power Estimation Block" that works in conjunction with the virtual prototype, called the P.E. Communication channel. This communication might be achieved by means of software methods or functions.
9. Increase the number of timing modes from the three modes (untimed, approximately timed and loosely timed) to include several intermediate modes in addition to the ones mentioned. In addition, include a cycle-accurate mode wherein a real clock signal is used.
10. A means of controlling the various timing modes in the virtual prototype.
11. To support the means of controlling, a control "knob" might be presented to the user in a Graphical User Interface or GUI, for ease of control. The control knob may serve to allow the user to select various timing modes in which the virtual prototype will operate.

Figure 3:
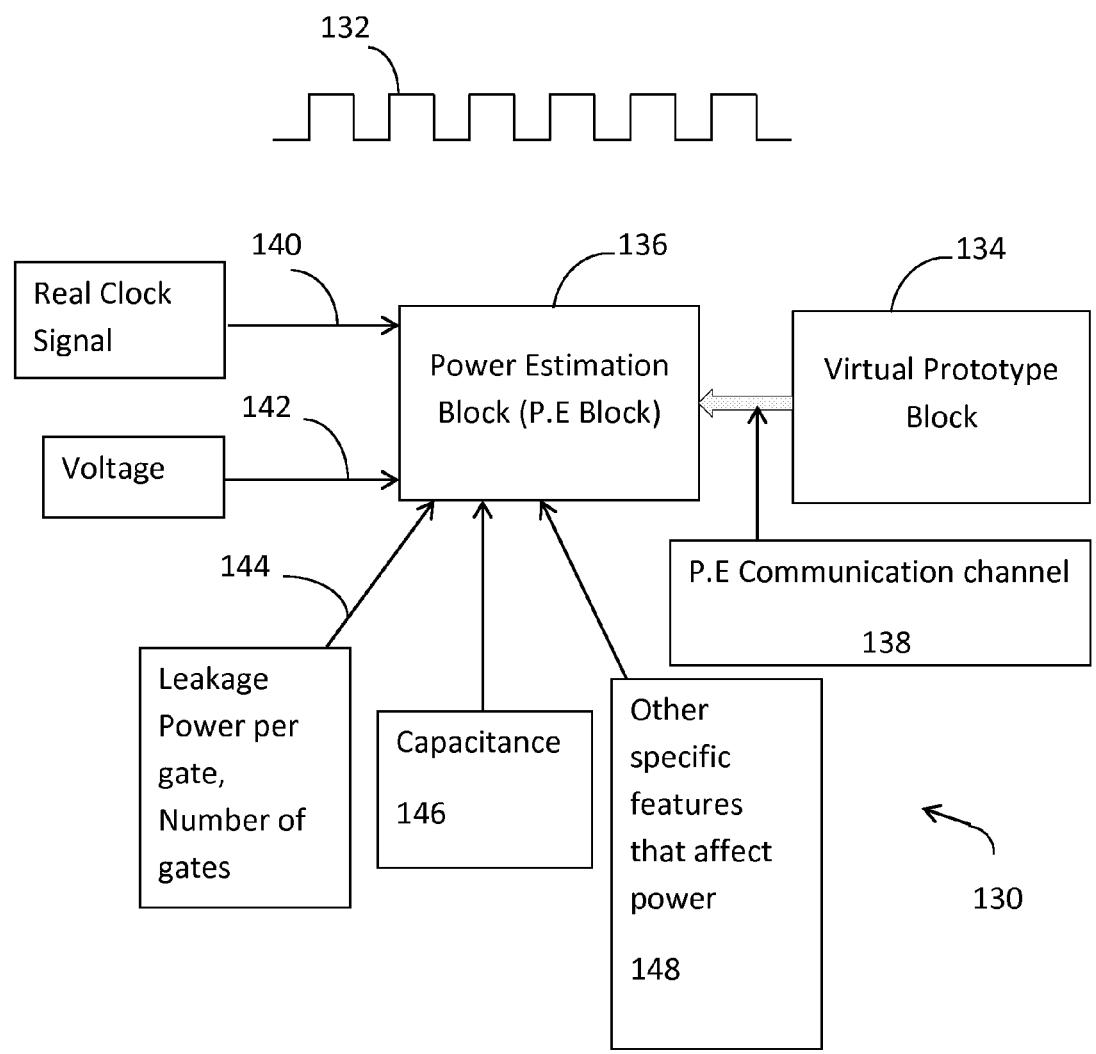
FIG. 3 is a block diagram of an exemplary method of power estimation including interaction between a power estimation block and a virtual prototype block, according to an embodiment of the present invention.

Further details on each step are now provided below, in reference to the system 130 in FIG. 3. The power estimation block or P.E. block 136 is associated with each virtual prototype block 134. The power estimation block 136 works in conjunction with the virtual prototype block 134 to determine what power state the block is currently in, such as, Sleep State, Active State, Reset State, Power—Off State, and such. The P.E block 136 may determine the power state by means of the P.E. communication channel 138. The P.E. communication channel 138 may be implemented by using any suitable software language such as SystemC, SystemVerilog, C, C++ or equivalent, using functions, methods or callbacks. The frequency signal 132 may be compared with the real clock signal 140.

The real clock signal 140 that is expected to be supplied to the design on which the virtual prototype is based must also be supplied to the P.E. block 136. The P.E. block 136 uses the real clock signal 140 to estimate how much power might be consumed by the virtual prototype in different timing modes. The voltage 142 that is expected to be supplied to the design must also be supplied to the P.E. block 136. The P.E. block 136 uses the voltage as a parameter as one of the inputs when estimating the power consumed in the virtual prototype. The loading capacitance 146 should be supplied to the P.E. block.

The leakage power per gate 144 that is expected in the design is supplied to the P.E. block 136. Other specific features that affect the power 148 for the Power Estimation Block 136 may be used. An expected number of gates may be supplied to the P.E. block 136.

Any additional information that is relevant to power estimation, such as some specific and unique features within the design block that might affect the power consumption more than normal might be supplied by the user to the P.E. block 136. Some examples (but not limited to this example) of these specific features might be the presence of floating, or un-driven output pins, which typically result in a large power draw. The P.E. block may use this information when estimating the power consumed by the virtual prototype.

A communication channel 138 between the P.E. block 136 and the virtual prototype block 134, to keep the P.E. block 136 informed of the current power state of the virtual prototype block 134, such as (but not limited to) clock frequency changes, power states such as Sleep State, Off State, Active State, quiescent state, outputs not being actively driven, and such. These are used by the P.E. block 136 to estimate the power consumed by the virtual prototype block 134 during the simulations. This channel might be based on software functions, methods or callbacks. Any other suitable means of communication may also be used.

Several intermediate timing modes may have additional gradations between the untimed, approximately timed, and loosely timed modes currently suggested by Accelera, the standards organization for virtual prototype modeling. In addition, a cycle-accurate mode may be used with the real clock signal as used by the design block.

A means of controlling the various timing modes should be present in the virtual prototype. This should allow the user to seamlessly choose between untimed modes on one end of the control, to the cycle-accurate mode on the other end of the control. Other timing modes such as approximately timed and loosely timed modes will be available, to be chosen in the middle of the control band. In addition, more gradations in the timing modes (semi-loosely timed, semi-approximately timed, semi untimed and such) should also be made available, though these are not defined by the standards committee Accelera currently. These "intermediate" timing modes will give greater flexibility to the user in choosing a timing mode.

The P.E. block 136 may have a control "switch" for the user to turn it on or off. For every virtual prototype block, a P.E. block may be built. For multiple instances of the same virtual prototype, there will exist multiple instances of the same P.E. block 136, operating independently. The Power Estimation block 136 may be built using power estimation algorithms designed specifically for use in a virtual prototyping platform, as described in detail earlier regarding the power estimation equations. These algorithms may be built using any of the suitable software languages available today, like C, C++, System C, System Verilog or other such languages.

The power that is estimated may be represented in a Graphical User Interface. During simulations, the estimated numerical entity may be continually updated by the P.E. block 136 and made available to the user in the Graphical User Interface in the form of a numbered, color-coded band, or any other visually useful method.

A virtual prototyping platform may include one or more virtual prototypes of the many blocks that make up a semiconductor chip. The P.E. blocks associated with the prototypes may be used to estimate the total power consumed within that platform, or a sub-section of the platform. A sub-section might consist of a subset of the blocks within the platform. Thus the total power that is consumed in a system may be estimated from the summation of the individual power estimates from a set of blocks that constitute the virtual prototype platform.

Figure 4:
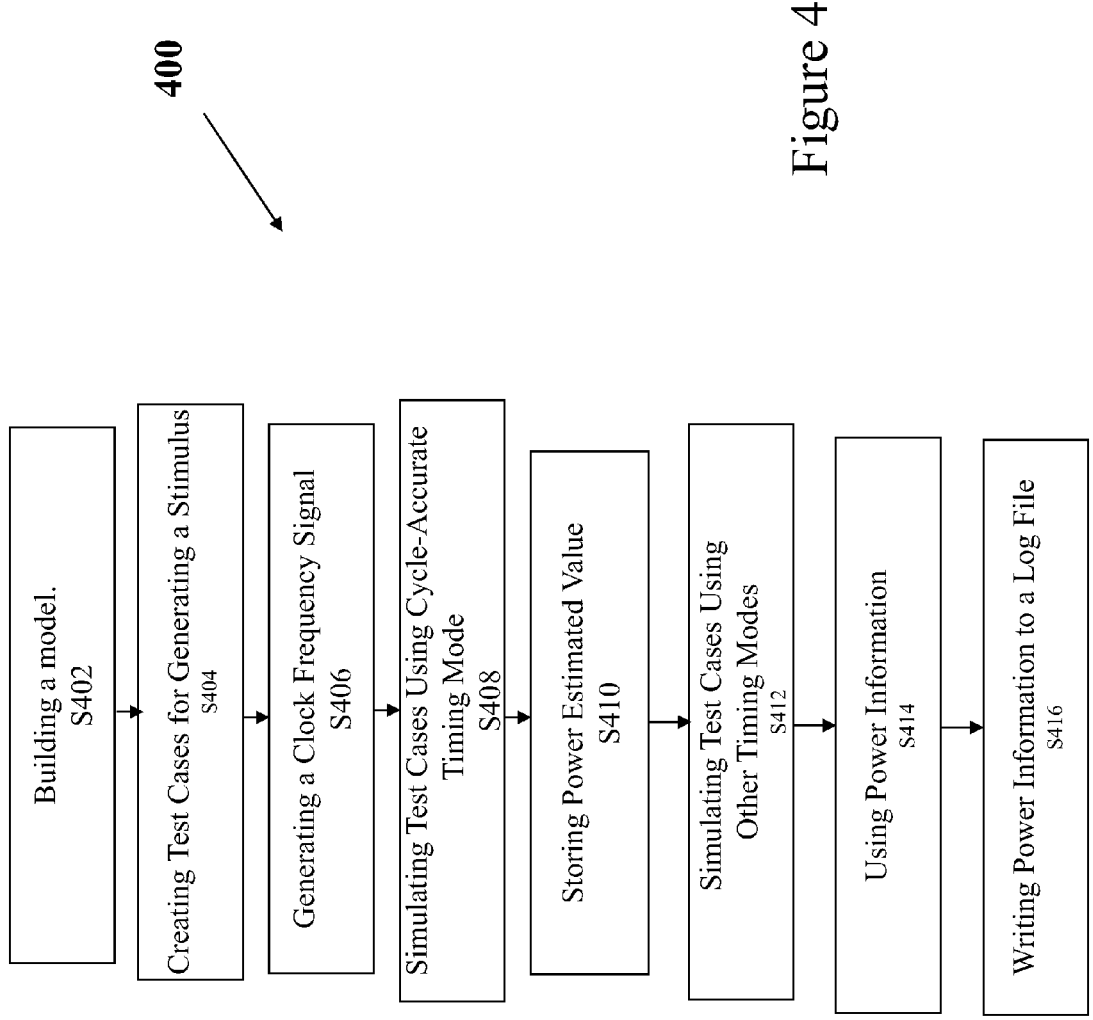
FIG. 4 is a flow chart of an exemplary method of power estimation, according to a further embodiment of the present invention.

A method 400 for estimating power consumption is shown in FIG. 4. The method may commence with Step S402 of building a model. Step S404 may comprise creating a test case or test cases for generating a stimulus. Generating a clock frequency signal may comprise Step S406. Another step, Step S408 may comprise stimulating test cases using a cycle-accurate timing mode. Still another step, S410 may comprise storing a power estimated value.

Another Step S412 may comprise simulating test cases using other timing modes, such as untimed modes, loosely timed modes, and any other suitable modes. At any time a Step S414 may comprise using power information. The power information may be stored in memory for the simulation. The power information may come from elsewhere, such as immediately from a processer without being stored, or from any other suitable source. Yet another Step S416 may comprise writing power information to a log file. The power information may be written at pre-determined intervals, which may permit output, such as line graphs, bar graphs, histograms, or other types of output to display the history of user power consumption.

The present invention may be practiced in several manners, including with various computer languages. SystemC is one particular language that is advisable for practicing the present invention. A SystemC model is a model of Register Transfer Level ("RTL") design as the model does not have gates. Thus, one may use the following methodology to estimate the equivalent number of "gates" expected in a particular SystemC model.

An object file may be produced in the compilation stage of a SystemC model or a parsing system may be used to parse the SystemC model description to generate a token file. From this object/token file, one may deduce the number of memory variables contained in a model. For example, a 32 bit "reg" type signal in the RTL may become a 32 bit wide "int" in a SystemC model. A single bit "reg" type may become a type sc_logic which may be only 1 bit wide in SystemC. From this operation, a table may be built for each data type existing in SystemC versus RTL. Not all variables in SystemC may be thought of as "reg" types in RTL. Usually, only variables appearing in the Left Hand Side ("LHS") of any equations or assignments inside a clocking class in SystemC should be considered as "reg" types in RTL.

Each "reg" type may now be represented as a SystemC data type. Each "reg" type may be considered as comprising one "D" type flip-flop when the RTL becomes a chip. Thus, the system may gather information on how much power is consumed by a "D" type flip-flop from a technology library. From the information on power estimation, the system may extrapolate the power estimation to other SystemC models.

A number of "virtual D type flip flops" in a SystemC model=32 in int, "n" in sc_unit<n>, sc_bv<n>, one in sc_logic. Total power consumed may be calculated as:

Number of "virtual $D$ type flip-flops" $nd$ times power estimation value of a single $D$ type flip flop from the technology library, "$pd$."

Total dynamic power consumed per clock event in the "virtual D flip flops may be considered as:

$Pf = nd*pd*f$ (where $f$ is the clock frequency)

If the power estimation of a D flip flop from a technology library is unavailable, the system may still use the following formula from earlier to estimate the power consumed by a "D" type flip flop:

$Pf = \frac{1}{2}Cd*ad*f*V^2$

The following information may be garnered from the technology library:
Cd=Capacitance estimation of the D type flip flop
ad=Area estimation of the D type flip flop
f=clock frequency
V=Voltage for the block.

Since an RTL block may have interconnecting pins, a SystemC model contains interconnecting pins as well. Here, the system employs the formula $\frac{1}{2}CV^2$.

When looking at interconnecting pins, the system may only apply the above formula when the pin transitions from a 1-0 or from a 0-1 signal state. Both C and V come from a technology library.

Total dynamic power consumed in the interconnects:

$Pi = \frac{1}{2}CV^2$ *Number of pins*number of signal transitions

A number of signal transitions may be measured easily by gathering the data from a signal transition dump file (also known as a "Value-Change Dump" file or a VCD file). Other forms of dump file may also be used. This file may be generated when applying a stimulus to a SystemC model.

Regarding quiescent, or leakage power, because the system may determine the number of "virtual D flip-flops" the present invention may also assume the amount of general quiescent power consumed along the following lines:

$Plf = nd*pdl$ where $pdl$ is the estimated leakage power per $D$ flip flop from a technology library.

Some of the power consumed is in the clock tree buffers. If the number of clock nodes is known, this should be input as well, and the system may assume a number of buffers per node. Activity in these blocks is at a maximum level, since many clock events propagate through these buffers and accounts for power consumption. These clock buffers and the clock tree may be optionally modeled in the SystemC model. Even if not modeled, the clock buffers may be thought of as existent for the purpose of power estimation.

$Pck = Nck*Nb*pb$

Pck=Total dynamic power consumed by the clock tree
Nck=Number of nodes in the clock tree
Nb=Number of clock buffers per node
pb=Dynamic power consumed per clock tree buffer (which will be available in a technology library). Since the SystemC model does not contain a clock tree such as in the RTL, this information is often used only to achieve a higher accuracy of the power estimation number.

A SystemC model may also contain some logic that does not translate to D flip flops. This logic might be estimated based on how many algorithmic equations exist, and how many terms are used. This can be done by parsing the code of the SystemC model. The system may estimate an approximate "virtual gate" count for each SystemC block.

The present invention may also function to determine how many variables might be equated with "reg" type, and whatever is left are the non-"reg" type variables. Then, the system may determine the widths in the same manner described for the "reg" type variables in point 9. Further, the system may determine the type of logical operation being done on these variables such as AND, OR, X-OR, and so on. Then the system may arrive at the number of those types of logical gates, determine the power consumption from the technology library, and determining the power estimation for the non-"reg" type variables.

Total power consumed per clock event in the "virtual gate"

$$Pg = ng * p\_virtual\_gate * f$$

where f is the clock frequency.

Leakage or quiescent power for "virtual gates" may be estimated as:

$$Plg = ng * pgl$$

where ng is the estimated number of virtual gates for this SystemC block, and pgl is the estimated leakage power per virtual gate from a technology library.

A total power is the summation of all these calculated values:

$$PsystemC = Plf + Plg + Pf + Pck + Pg + Pi.$$

The system may log the power estimation information at pre-determined intervals. This log information may be visualized in the form of histograms, bar graphs, line graphs, or in various other suitable forms of output. Any other graphical representation might be used, such as red for high power consumption, orange, yellow and white for medium power consumption, and green for low power consumption.

Figure 5:
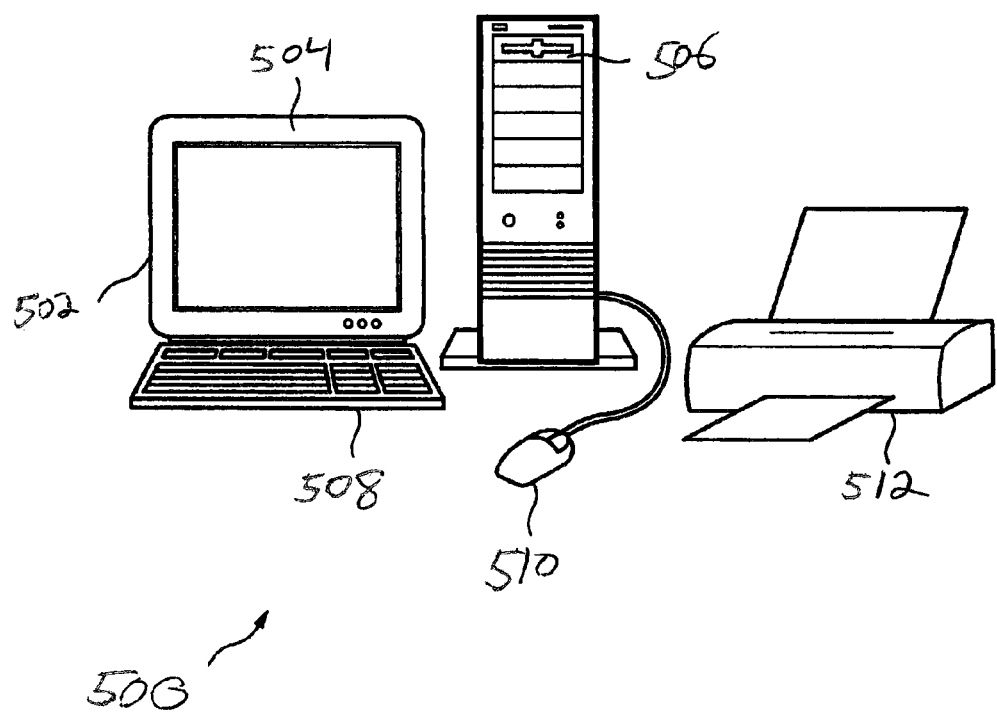
FIG. 5 shows a typical computer system for employing the present invention.

Referring to FIG. 5, a combined data entry and waveform system for rapid behavioral verification of digital hardware designs 500 may comprise a personal computer 502 including a monitor 504, a storage device (such as a hard disk) 506, input devices such as a keyboard 508 and a mouse 510 and peripherals, such as a printer 512. The storage device 506 may be a computer readable storage medium.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

I claim:

1. A method for measuring power using a virtual prototype block, comprising:
   receiving the virtual prototype block representing an integrated circuit, wherein the virtual prototype block is a transaction level model of the integrated circuit and is generated without synthesizing the integrated circuit;
   associating a power estimation block with the virtual prototype block, the power estimation block configured to determine a power state of the virtual prototype block;
   storing, in a memory, information specific to the virtual prototype block including a real clock signal, a supply voltage, an expected number of gates, a per-gate leakage power, and a loading capacitance;
   simulating, by a processor executing a circuit simulation tool, the virtual prototype block; and
   generating, during the simulation of the virtual prototype block, an estimate of power consumed by the integrated circuit by inputting the stored information to the power estimation block.

2. The method of claim 1, further comprising generating the expected number of gates by parsing, by the processor, the virtual prototype block to identify a number of memory variables in the virtual prototype block that corresponds to a number of virtual flip-flops.

3. The method of claim 2, further comprising identifying a number of virtual gates based on algorithmic equations represented in the virtual prototype block.

4. The method of claim 1, wherein simulating the virtual prototype block uses an approximation of the real clock signal to the virtual prototype block.

5. The method of claim 4, further comprising, during the simulation, comparing the real clock signal to the approximation of the real clock signal.

6. The method of claim 1, further comprising parsing the virtual prototype block by the processor to identify variables.

7. The method of claim 6, further comprising associating the identified variables to virtual flip-flops to flip-flop and virtual gates to cell of a technology library.

8. The method of claim 7, further comprising mapping the virtual flip-flops and virtual gates to corresponding cells of a technology library.

9. The method of claim 8, wherein the estimate of power consumed by the integrated circuit is generated based on the mapping.

10. The method of claim 1, wherein the power states include a sleep state, an active state, a reset state, and a power-off state.

11. The method of claim 1, wherein the virtual prototype block is a register transfer level representation of the integrated circuit.

12. The method of claim 1, further comprising obtaining the supply voltage from a technology library.

13. The method of claim 1, further comprising obtaining the loading capacitance from a technology library.

14. The method of claim 1, further comprising obtaining the per-gate leakage power from a technology library.

15. The method of claim 1, wherein simulating the virtual prototype block uses an approximation of the real clock signal based on an intermediate timing mode that differs from an untimed timing mode, an approximately timed timing mode, and a loosely timed timing mode.

16. The method of claim 1, wherein the transaction level model of the integrated circuit is a register transfer level model.

17. A system for measuring power in a virtual prototype block for a model semiconductor design, comprising:
   a memory configured to store information specific to the virtual prototype block including a real clock signal, a supply voltage, an expected number of gates, a per-gate leakage power, and a loading capacitance; and
   a processor coupled to the memory and configured to:
   receive the virtual prototype block representing an integrated circuit, wherein the virtual prototype block is a transaction level model of the integrated circuit and is generated without synthesizing the integrated circuit;
   associate a power estimation block with the virtual prototype block, the power estimation block configured to determine a power state of the virtual prototype block;
   store the information specific to the virtual prototype block into the memory;
   simulate, by executing a circuit simulation tool, the virtual prototype block; and
   generate, during the simulation of the virtual prototype block, an estimate of power consumed by the integrated circuit by inputting the stored information to the power estimation block.

18. The system of claim 17, wherein simulation of the virtual prototype block uses an approximation of the real clock signal to the virtual prototype block.

19. A non-transitory computer-readable storage medium storing instructions that, when executed by a processor, cause the processor to perform steps comprising:
   receiving the virtual prototype block representing an integrated circuit, wherein the virtual prototype block is a transaction level model of the integrated circuit and is generated without synthesizing the integrated circuit;

associating a power estimation block with the virtual prototype block, the power estimation block configured to determine a power state of the virtual prototype block;

storing, in a memory, information specific to the virtual prototype block including a real clock signal, a supply voltage, an expected number of gates, a per-gate leakage power, and a loading capacitance;

simulating, by executing a circuit simulation tool, the virtual prototype block; and generating, during the simulation of the virtual prototype block, an estimate of power consumed by the integrated circuit by inputting the stored information to the power estimation block.

20. The non-transitory computer-readable storage medium of claim 19, wherein simulating the virtual prototype block uses an approximation of the real clock signal to the virtual prototype block.

* * * * *